United States Patent [19]

Hillemeier

[11] 4,309,610
[45] Jan. 5, 1982

[54] METHOD OF DETERMINING THE LOCATION, ORIENTATION AND PATTERN OF REINFORCING MEMBERS IN REINFORCED CONCRETE

[75] Inventor: Bernd Hillemeier, Wiesbaden, Fed. Rep. of Germany

[73] Assignee: Hochtief Aktiengesellschaft vorm. Gebrüder Helfmann, Essen, Fed. Rep. of Germany

[21] Appl. No.: 146,331

[22] Filed: May 2, 1980

[30] Foreign Application Priority Data

May 3, 1979 [DE] Fed. Rep. of Germany ....... 2917796

[51] Int. Cl.³ .............................................. G01J 1/00
[52] U.S. Cl. ..................................... 250/342; 250/338
[58] Field of Search ............... 250/339, 338, 340, 342, 250/358 R; 73/15 R, 355 R, 355 EM

[56] References Cited

U.S. PATENT DOCUMENTS 4,005,289  1/1977  Del Grande ................... 250/339 X
4,174,480  11/1980  Kaihara et al. ...................... 250/342

*Primary Examiner*—Davis L. Willis
*Attorney, Agent, or Firm*—Karl F. Ross

[57] ABSTRACT

A method of determining location and orientation of metallic reinforcing members in reinforced concrete whereby the members are heated inductively, e.g. by a spiral coil lying in a plane parallel to the plane of the reinforced concrete slab, and the heating of the members is detected by thermally sensitive means, such as a camera (e.g. thermovision), film or paper responsive to infrared radiation. The heat pattern represents the pattern of reinforcement.

6 Claims, 4 Drawing Figures

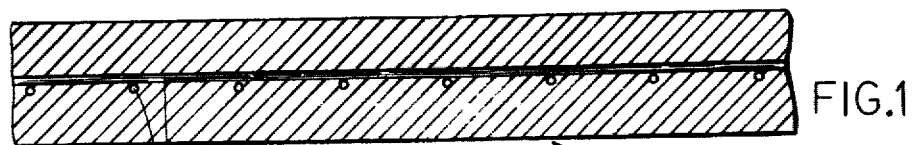
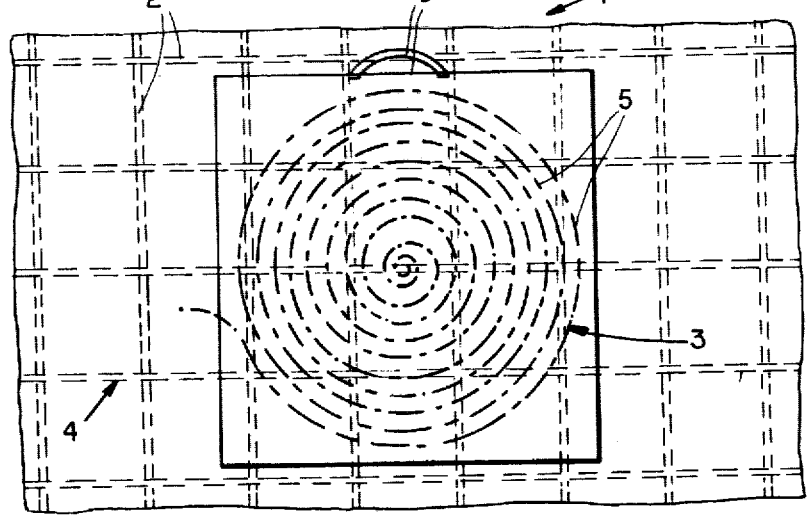
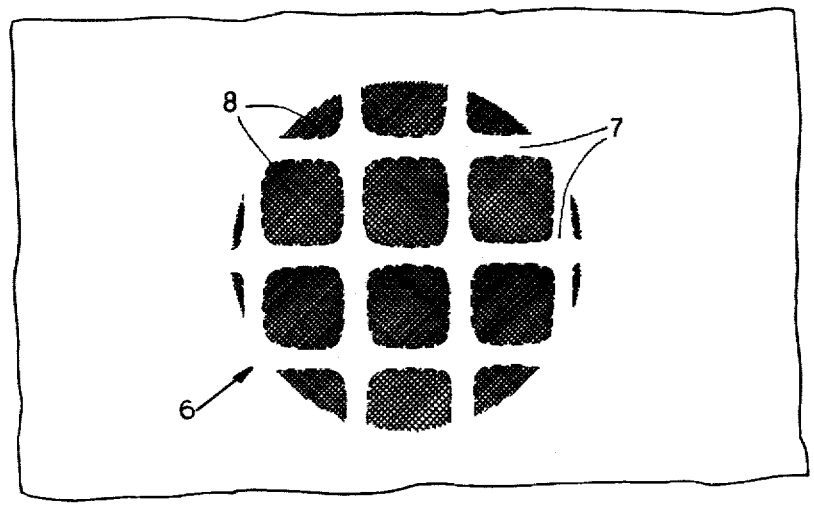
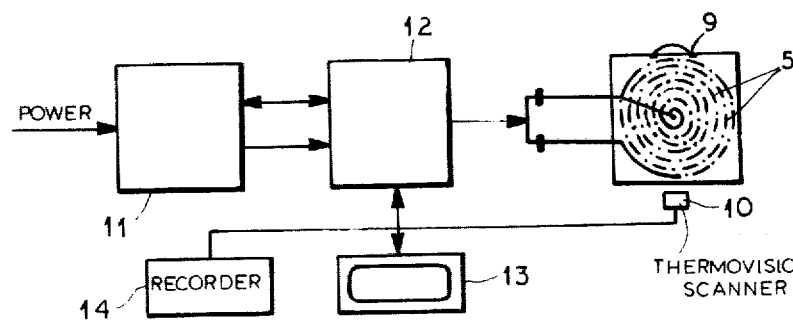

METHOD OF DETERMINING THE LOCATION, ORIENTATION AND PATTERN OF REINFORCING MEMBERS IN REINFORCED CONCRETE

FIELD OF THE INVENTION

My present invention relates to a method of determining the location, orientation and pattern of metallic reinforcing members in reinforced concrete and, more particularly, to a method of evaluating the disposition of such reinforcing members in relatively thick concrete bodies so that, for example, holes may be drilled in the concrete structure without interference by the reinforcing members or damage thereto.

BACKGROUND OF THE INVENTION

Reinforced concrete generally comprises a concrete mix, including the usual hydraulic cement and aggregate, in which reinforcing members are embedded and hence become invisible to the naked eye so that subsequent work with the reinforced concrete structure which requires penetration may damage the reinforcing members or may be interfered with by the reinforcing members.

The reinforcing members may be in the form of individual reinforcing bars (rebar), which can be bent or straight, rebar arrays interconnected by spacers or transverse members in one or more layers, wired together or relatively free from one another, reinforcing mats, baskets or the like. These members may be stressed, i.e. held under tension in the case of prestressed concrete structures, or simply laid into the concrete.

It is important, e.g. for penetrating the concrete structure without interference or damage to the reinforcement, to be able to ascertain from a surface of the structure the location, orientation and pattern of the reinforcing members, these parameters being collectively referred to herein as the disposition of the reinforcement.

It has already been proposed to determine the disposition of reinforcing members in a finished concrete structure by the use of so-called metal detectors which can include an electromagnet generating an electromagnetic field and means responsive to the distortion of the field caused by the presence of the ferromagnetic or predominantly iron reinforcing elements. However, experience has shown that in relatively thick concrete structures, in which the reinforcements are disposed 10 cm or more from the surface, the metal detector technique does not work. Furthermore, even at a distance of less than 10 cm, accurate determinations cannot be made if the reinforcements are relatively close together because the magnetic field distortion becomes diffuse.

For embedded depths of 10 cm or more, e.g. up to 60 cm, it is possible to use hard gamma radiation which is disadvantageous since both the source of the radiation and the detector are then comparatively expensive and may involve dangers to operating personnel.

Experiments with ultrasonics for the same purpose have demonstrated that these techniques are not effective because the sharp edges and facets of the aggregate reflect the ultrasonic waves in diverse ways to interfere with the ability to accurately detect the disposition of the reinforcing elements.

OBJECTS OF THE INVENTION

It is, therefore the principal object of the present invention to provide an improved method of determining the disposition of metal reinforcing members in reinforced concrete, especially slabs or reinforced concrete whereby the disadvantages of the prior-art methods are obviated.

Another object of this invention is to provide a relatively precise method of determining the disposition of reinforcing members in reinforced concrete from a surface thereof which is operable at low cost with relatively unskilled labor and provides accurate measurements even when the concrete structure is thick or the reinforcing members are comparatively close to one another.

SUMMARY OF THE INVENTION

These objects and others which will become apparent hereinaftfer are attained, in accordance with the present invention, by heating the reinforcing members embedded in the concrete inductively, i.e. by generating an alternating magnetic field at a location outside the structure and which is intercepted by the reinforcing members, and measuring the thermal energy radiated from the reinforcement at the surface of the structure. The electromagnetic alternating field is, of course, of such frequency and power that the reinforcing members will be heated thereby.

According to a feature of the invention, the magnetic field is generated by a flat spiral coil, preferably an Archimedean spiral, lying in a plane parallel to the surface and forming the induction coil energized by an alternating electric current. The planar coil can be applied directly to this surface and can cover, in area, the surface for which a projection of the reinforcement pattern on the surface is desired.

The detection of the thermal radiation from the reinforcement can be affected in various ways, e.g. the scanning of the surface with a temperature sensor such as a thermocouple, the application of a pattern or matrix of temperature sensors to the region originally convered by the coil, etc.

Preferably however, the thermal radiation from the reinforcing members is effected by a determination of the pattern or infrared radiation using infrared sensitive means, e.g. thermovision, using a pickup with appropriate thermal radiation optics and providing an image with contrasting points representing different temperature levels upon a television screen.

Of course, the detection can be made with infrared sensitive photograpic films or papers which can be directly applied to the surface or through an intermediary of a photographic or television cameras. Thermography with conventional devices can thus be used.

While the inductive heating of metallic objects such as tubes and rods of steel has long been known, such inductive heating processes have been used at least mainly for heat treatment in association with working or fabricating the objects, welding and the like. I am not aware that inductive heating has ever been used to ascertain the position of iron or steel members in concrete by a sensing of the heated members through the concrete body.

It is indeed surprising that the reinforcing members can be heated through comparatively thick layers of concrete and, as so heated, can emit thermal radiation which can distinguish the pattern of the reinforcing members.

Even more surprising is the fact that while detection of the distortion of magnetic fields at 10 cm or more or concrete thickness has proved to be ineffective, the thermal method of the present invention remains effective at thicknesses greater than 10 cm.

The frequency and power used for heating the reinforced members can, of course, be selected as required to carry out the heating operation, although it has been found to be advantageous to heat the reinforcing members in the briefest possible time. I have found that frequencies of 5,000 to 10,000 Hz are most effective. The concrete itself remains practically unheated by the electromagnetic field and is only slightly heated by conductive contact with the reinforcing members so that radiation from these members can serve to accurately indicate their disposition.

The thermal radiation from the reinforcing members is in the infrared range and, while one would normally expect this radiation to be thoroughly diffused by the time it reaches the surface, it appears that the radiation from each reinforcing element progresses outwardly in a cylindrical front of isothermals which has a progressively increasing radius until that front reaches the surface of the concrete structure at which it can be detected. Since the intersection between a plane and a cylinder is a line, the thermal front can be discerned by infrared detection methods at the surface as a line representing the reinforcing element which gradually widens. Because of the possibility of detecting the front as a line or an extremely narrow strip, highly precise measurements can be made.

I have found that it is possible to obtain this result as long as the reinforcing members are heated to about 20° C. above the ambient temperature within the concrete structure but to a temperature not greater than 80° C. and preferably in the range of about 50° to 60° C.

With these temperature conditions the characteristics of the reinforcing steel will not be altered. This also applies to cold-worked steels. In any event, the temperature should be maintained below 100° C. to avoid problems with the concrete.

When detection is made by thermographic methods and equipment, the reinforcing members are found directly below the lines of greatest intensity and in the shadow of these members may lie others. The lines corresponding to the reinforcements may be marked on the surface and any construction operations can take place without interference by or with the reinforcement members in zones between the markings.

According to the apparatus aspect of the invention, the above-mentioned spiral induction coil is provided and can have its frequency and power altered as required by the particular reinforcement pattern, size of the reinforcing rods, and distribution. Naturally, the system also includes the means for detecting the radiation.

BRIEF DESCRIPTON OF THE DRAWING

The above and other objects, features and advantages of the present invention will become more readily apparent from the following description, reference being made to the accompanying drawing in which:

FIG. 1 is a cross-sectional view showing a reinforced concrete wall or slab for which the reinforcement disposition is to be determined;

FIG. 2 is an elevational view of the concrete structure of FIG. 1 showing the positioning of the induction coil thereon;

FIG. 3 is a diagram showing the thermal radiation pattern obtained following the inductive heating of the structure as shown in FIG. 2; and FIG. 4 is a diagram illustrating an apparatus for carrying out the invention.

Specific Description

In FIG. 1 I have shown a concrete slab or wall 1 provided with embedded reinforcement in the form of reinforcing rods 2 here shown to lie in two orthogonal arrays of mutually parallel transversely spaced bars. While the projection of the pattern on the surface of the concrete structure 1 is not apparent to the naked eye on the surface, it does, of course, correspond to the broken line showing in FIG. 2.

To determine the dispostion in a given region 3, a planar induction coil 5, in the form of an Archimedean spiral mounted in a holder or manipulator 9, is applied to the surface.

The induction coil, energized as shown in FIG. 4, is capable of generating an alternating magnetic field which is applied perpendicular to the surface and the plane of the spiral over the region 3 covered by the spiral to inductively heat the reinforcing members 2.

The frequency and power of the alternating magnetic field is so selected that these reinforcing elements are heated to a temperature 20° C. above their original temperatures and in the range of 50° to 60° C. in the period of the order of several minutes, whereupon the induction coil is cut off and the surface scanned by thermovision or infrared pattern detector cameras.

FIG. 3 shows the thermographic raster 6 which corresponds to the detected infrared pattern with white lines 7 separating black fields 8, each of the white lines 7 corresponding to a reinforcement. The reinforcement pattern 4 thus corresponds to the white line pattern 7 and can be accurately determined. Naturally, since a respective pattern is usually used, the ascertained pattern can be assumed to be reproducible elsewhere on the surface. If desired, other similar determinations can be made elsewhere.

Experiments have shown that the technique described gives the location of the reinforcements with millimeter precision.

In FIG. 4 the induction coil 5 is shown to be mounted on a manipulator so that it can easily be applied to the steel structure and can be energized by a power source 11 at a frequency of 5,000 to 10,000 Hz with a power controlled by the controller 12 which can also de-energize the coil and activate the heat scanner 10 when a sufficient temperature has been attained in the bars. A screen 13 can display the pattern or the latter can be recorded permanently at 14, e.g. on photographic film.

I claim

1. A method of detecting the disposition of metallic reinforcing members in a structure of reinforced concrete, comprising the steps of:
   (a) inductively heating said members to a temperature above the ambient temperature; and
   (b) detecting the thermal radiation pattern at said surface whereby heated regions thereof correspond to respective reinforcing members.

2. The method defined in claim 1 wherein said members are inductively heated by generating an alternating electromagnetic field generally perpendicular to said surface over a region thereof for which the reinforced pattern is to be determined.

3. The method defined in claim 2 wherein said field is generated by applying a flat induction coil parallel to said surface and having the configuration of a flat Archimedean spiral, and energizing said coil with an alternating current having a frequency of 5,000 to 10,000 Hz.

4. The method defined in claim 2 or claim 3 wherein the radiation pattern at said surfae is determined by thermovision scanning of the surface to display the pattern on a television screen.

5. The method defined in claim 1, claim 2 or claim 3 wherein said members are inductively heated to a temperature at least 20° C. above ambient but less than to a temperature of 80° C.

6. The method defined in claim 5 wherein said reinforcing members are inductively heated to a temperature of about 50° C. to 60° C. in step (a).

* * * * *